(12) United States Patent
Byun

(10) Patent No.: US 11,525,747 B2
(45) Date of Patent: Dec. 13, 2022

(54) SENSING DEVICE THAT PREVENTS MAGNETIC FIELD INTERFERENCE

(71) Applicant: LG INNOTEK CO., LTD., Seoul (KR)

(72) Inventor: Sung Wook Byun, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 21 days.

(21) Appl. No.: 16/973,568

(22) PCT Filed: Nov. 19, 2018

(86) PCT No.: PCT/KR2018/014185
§ 371 (c)(1),
(2) Date: Dec. 9, 2020

(87) PCT Pub. No.: WO2020/017705
PCT Pub. Date: Jan. 23, 2020

(65) Prior Publication Data
US 2021/0247252 A1    Aug. 12, 2021

(30) Foreign Application Priority Data

Jul. 16, 2018 (KR) .................. 10-2018-0082565

(51) Int. Cl.
*G01L 3/10* (2006.01)
*B62D 6/10* (2006.01)

(52) U.S. Cl.
CPC .............. *G01L 3/104* (2013.01); *B62D 6/10* (2013.01)

(58) Field of Classification Search
CPC .............. G01L 3/104; G01L 3/10; B62D 6/10
(Continued)

(56) References Cited

U.S. PATENT DOCUMENTS

2001/0048301 A1   12/2001   Schlabach et al.
2002/0152821 A1   10/2002   Strothmann
(Continued)

FOREIGN PATENT DOCUMENTS

CN     104039632 A    9/2014
DE     202 20 383 U1  7/2003
(Continued)

*Primary Examiner* — Octavia Davis Hollington
(74) *Attorney, Agent, or Firm* — Birch, Stewart, Kolasch & Birch, LLP

(57) ABSTRACT

An embodiment relates to a sensing device comprising: a stator; and a rotor, at least a part of which is arranged on the stator. The stator comprises a stator holder, a stator body coupled to the stator holder, and a first stator tooth and a second stator tooth arranged on the stator body. The rotor comprises a rotor holder, a rotor body coupled to the rotor holder, and a magnet coupled to the rotor body. The first stator tooth comprises a first body and multiple first teeth connected to the first body and spaced apart from each other. The second stator tooth comprises a second body and multiple second teeth connected to the second body and spaced apart from each other. The multiple first teeth and the multiple second teeth overlap in the radial direction. Accordingly, the sensing device can prevent or minimize magnetic-field interference resulting from an external magnetic field generated outside during torque measurement.

17 Claims, 16 Drawing Sheets

(58) Field of Classification Search
USPC .................................................. 73/862.321
See application file for complete search history.

(56) References Cited

U.S. PATENT DOCUMENTS

| | | | | |
|---|---|---|---|---|
| 2009/0027045 | A1* | 1/2009 | Islam | G01L 3/104 |
| | | | | 324/207.13 |
| 2014/0283623 | A1 | 9/2014 | Song | |
| 2017/0276558 | A1* | 9/2017 | Jun | B62D 6/10 |
| 2022/0214236 | A1* | 7/2022 | Byun | B62D 6/10 |

FOREIGN PATENT DOCUMENTS

| | | | |
|---|---|---|---|
| EP | 1 424 541 A2 | | 6/2004 |
| EP | 2 455 735 A1 | | 5/2012 |
| KR | 10-2009-0097378 A | | 9/2009 |
| KR | 100915264 | * | 9/2009 |
| KR | 100976701 | * | 8/2010 |
| KR | 20100092243 | * | 8/2010 |
| KR | 10-2013-0063214 A | | 6/2013 |
| KR | 20150034984 | * | 4/2015 |
| KR | 10-2017-0011599 A | | 2/2017 |
| KR | 10-2018-0009581 A | | 1/2018 |

* cited by examiner

[FIG. 1]
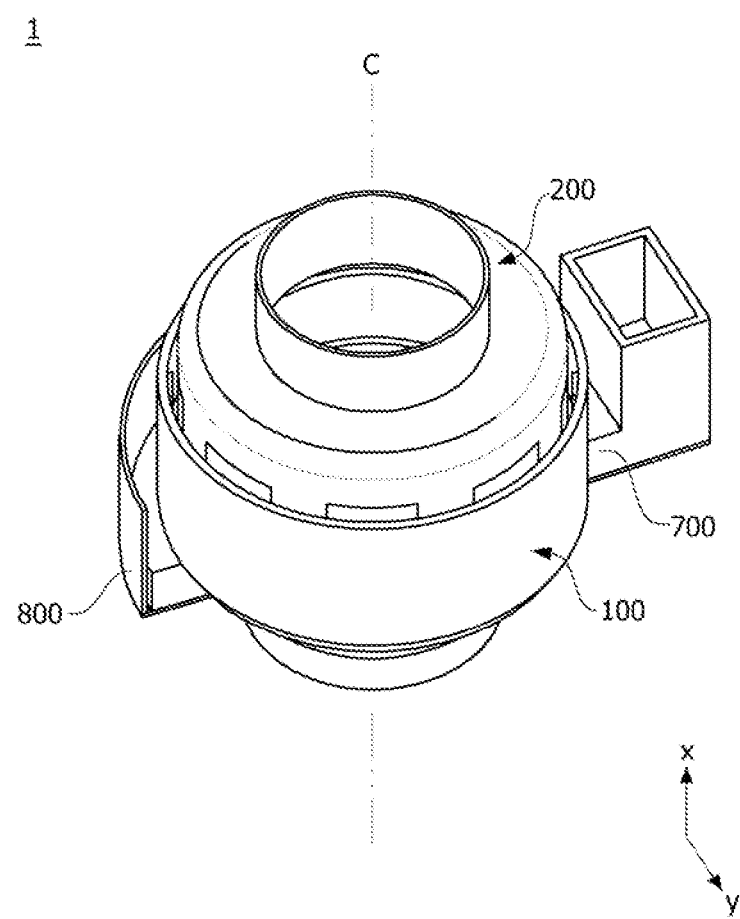

[FIG. 2]
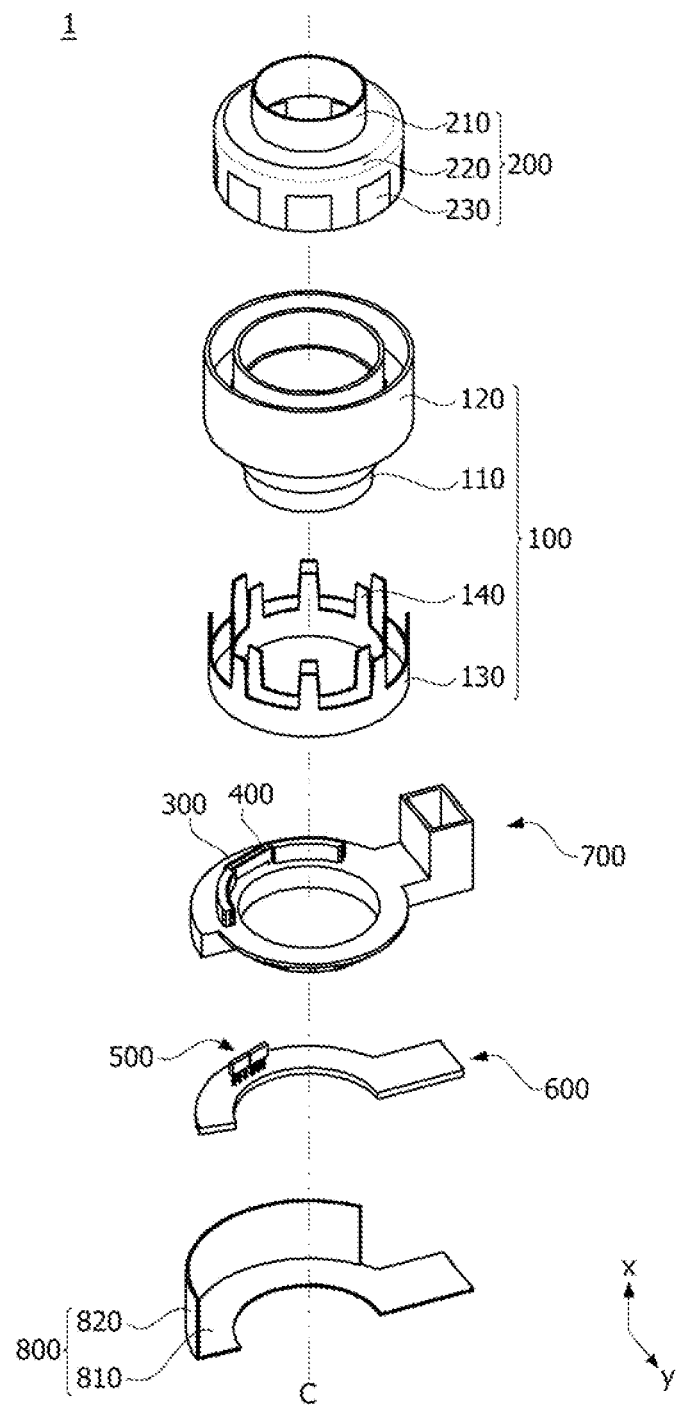

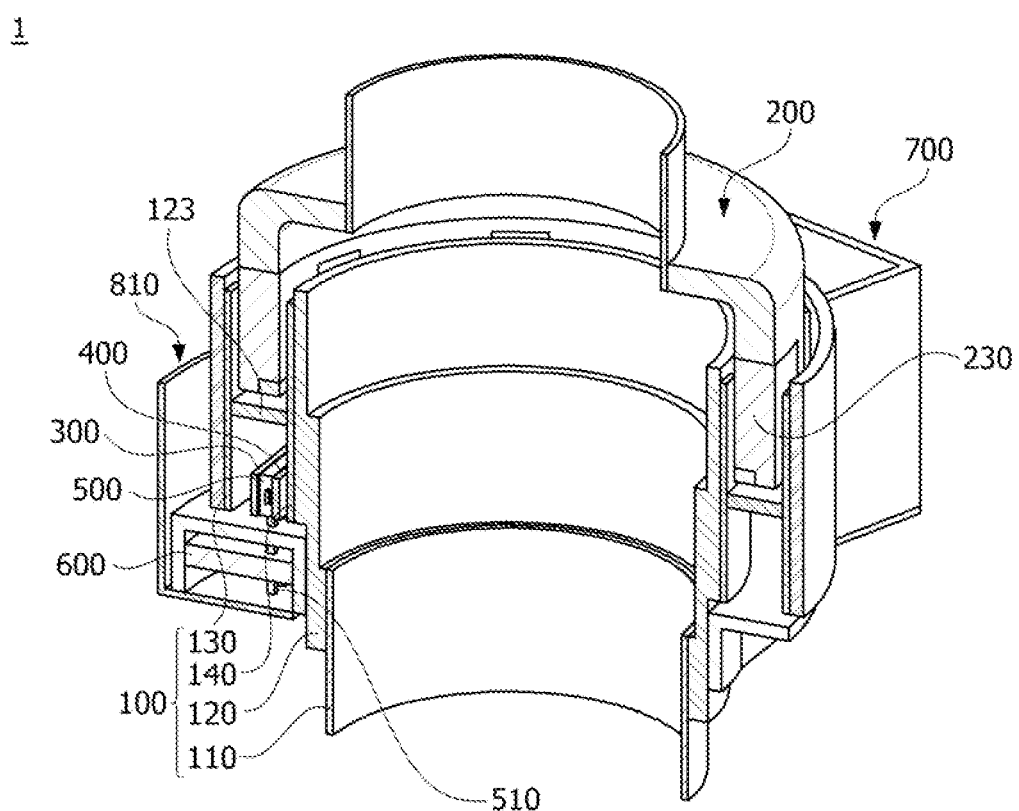
[FIG. 3]

[FIG. 4]
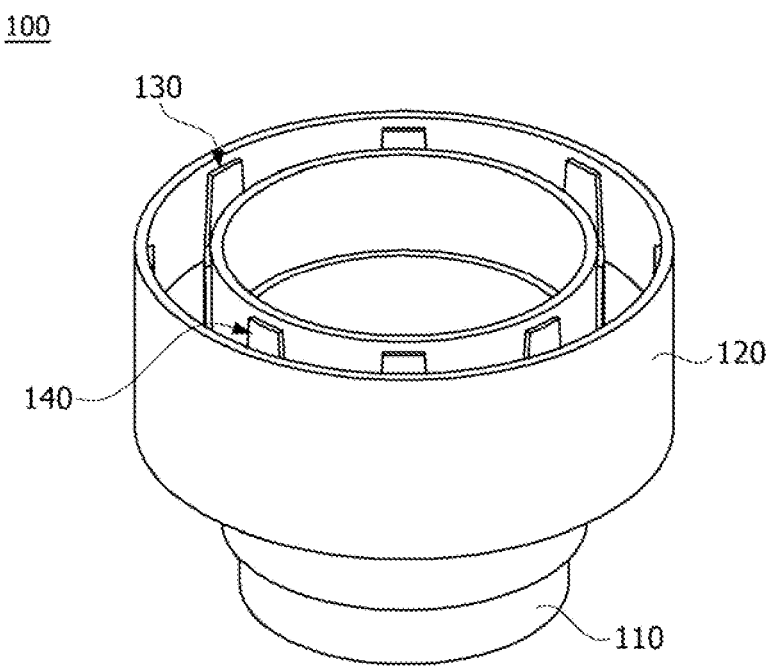

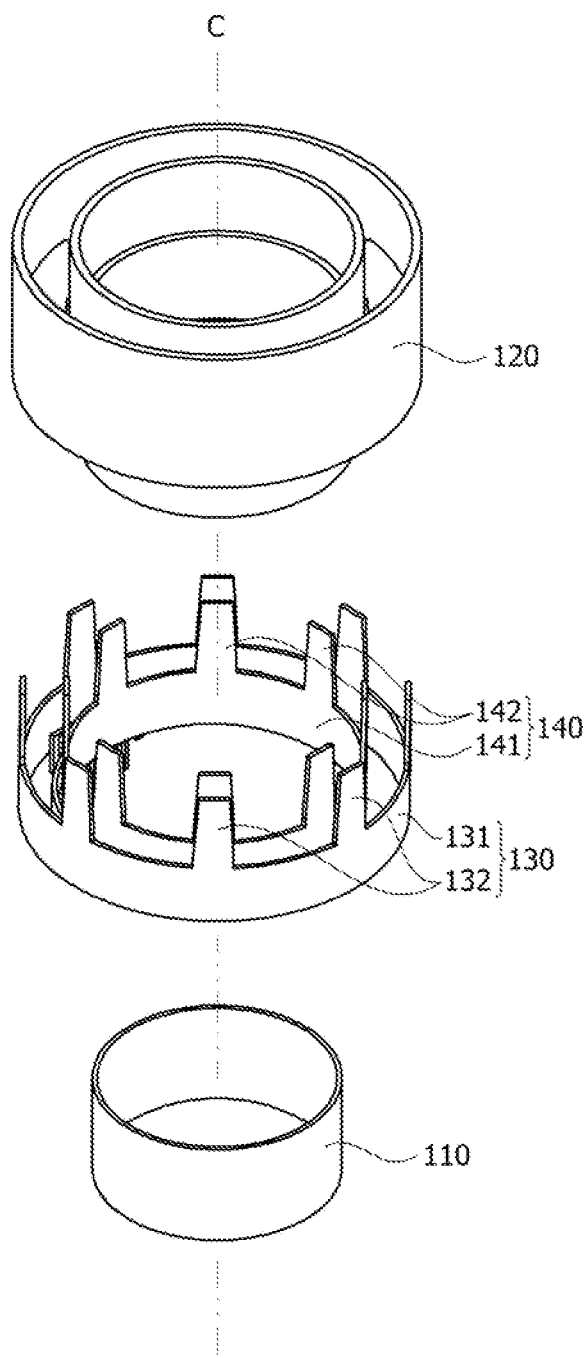
[FIG. 5]

[FIG. 6]
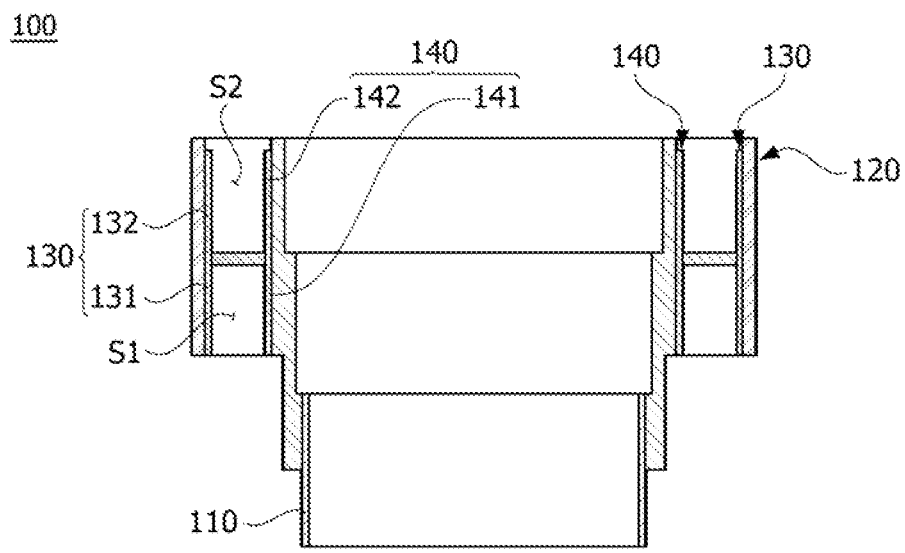
[FIG. 7]
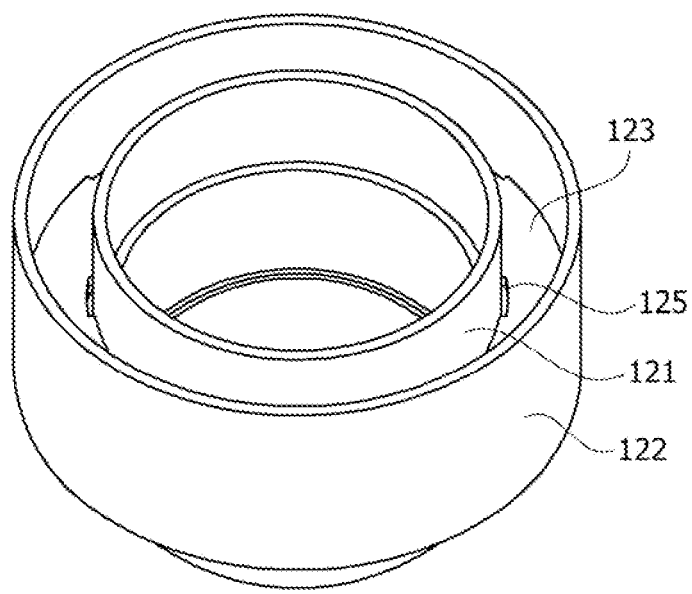

[FIG. 8]
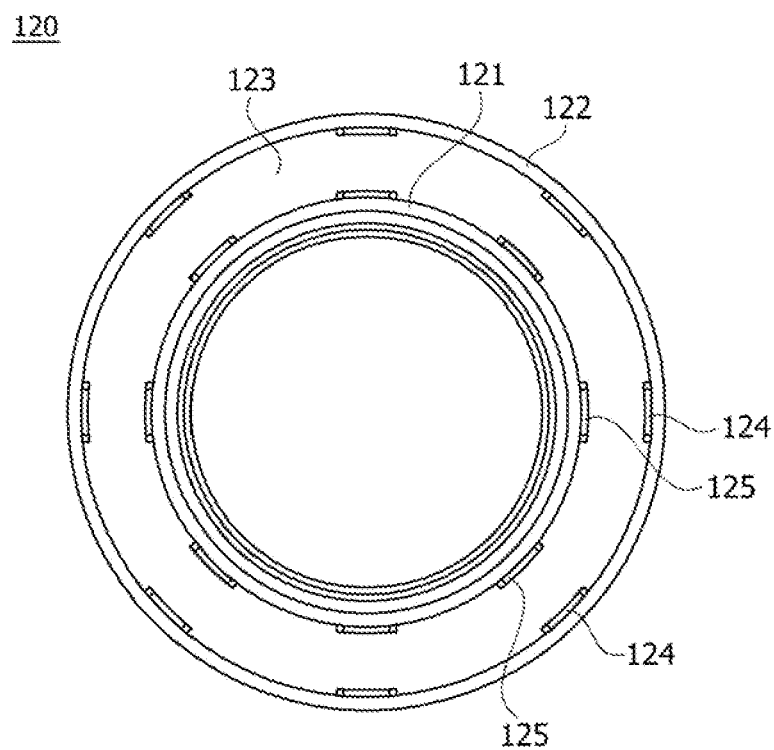
[FIG. 9]
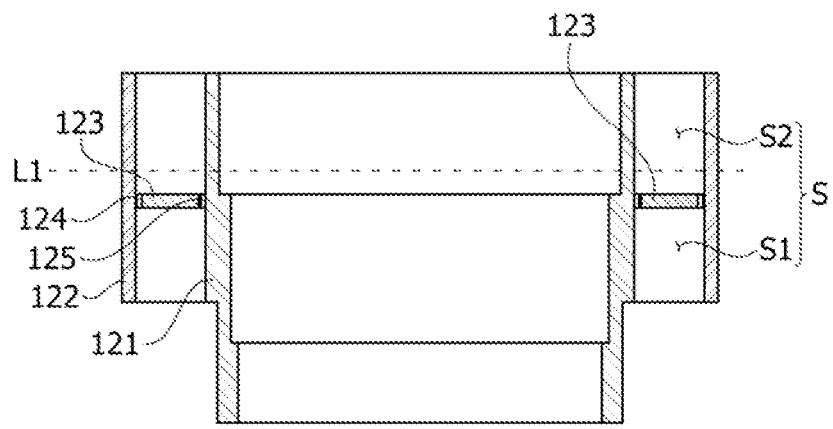

[FIG. 10]
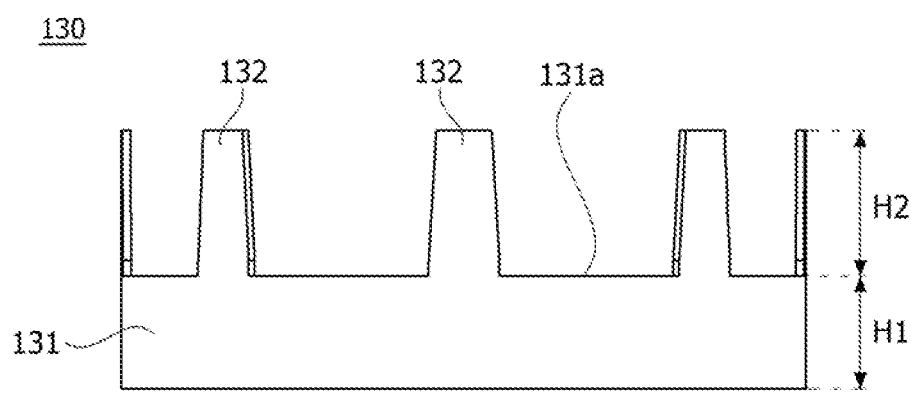
[FIG. 11]
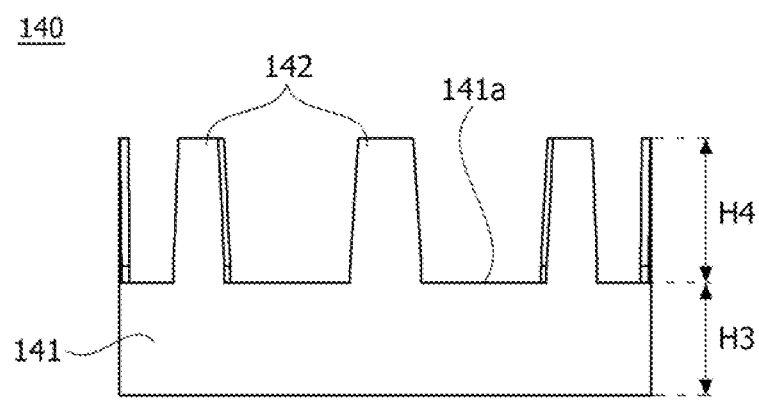

[FIG. 12]
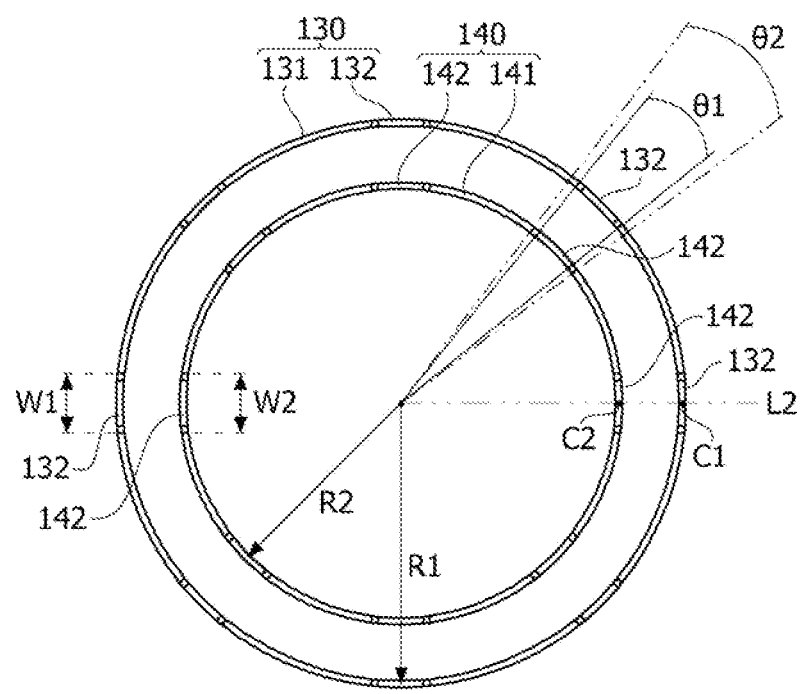

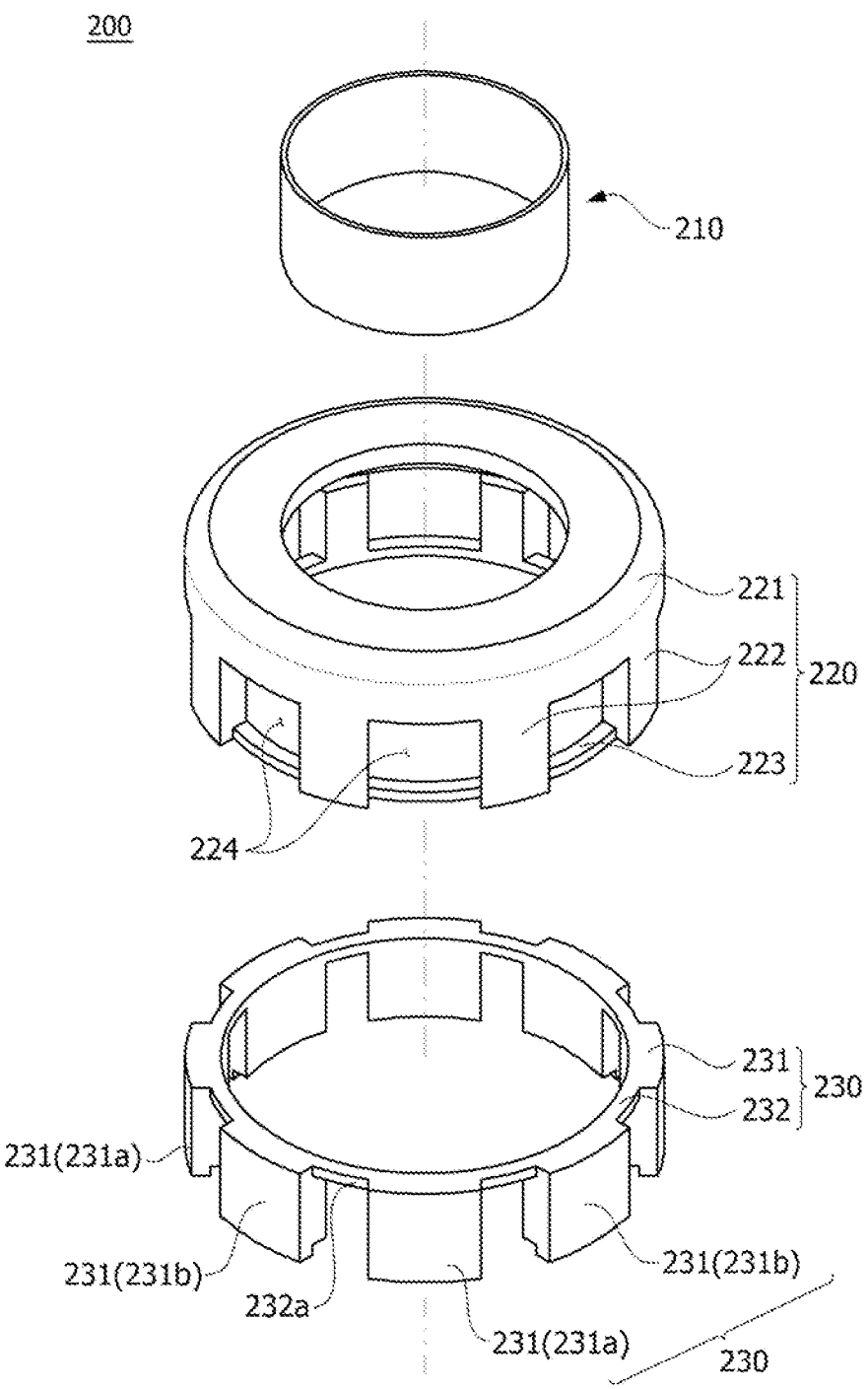
[FIG. 13]

[FIG. 14]
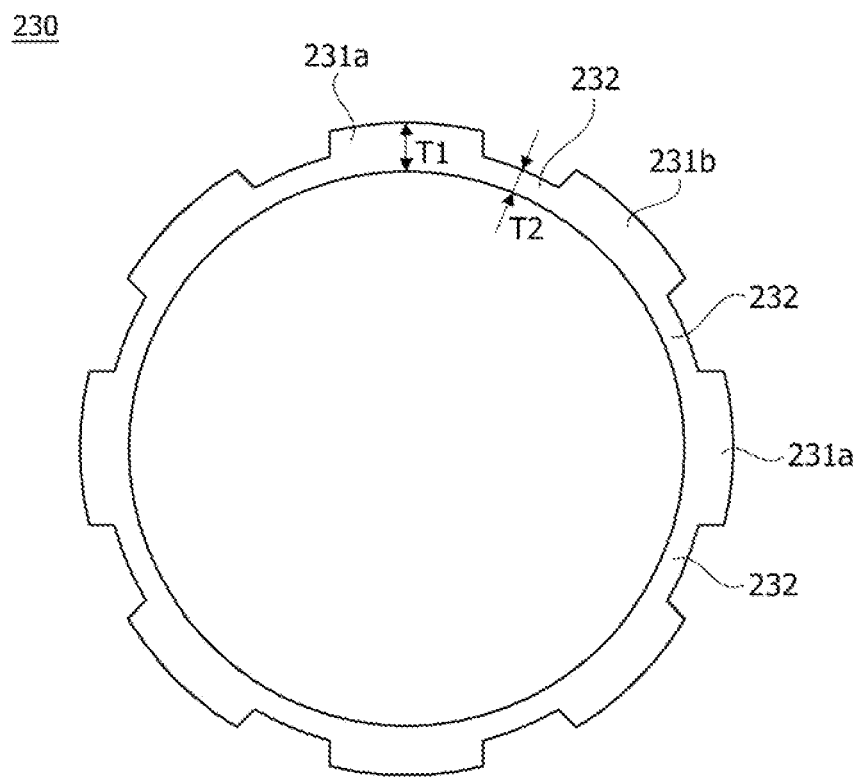
[FIG. 15]
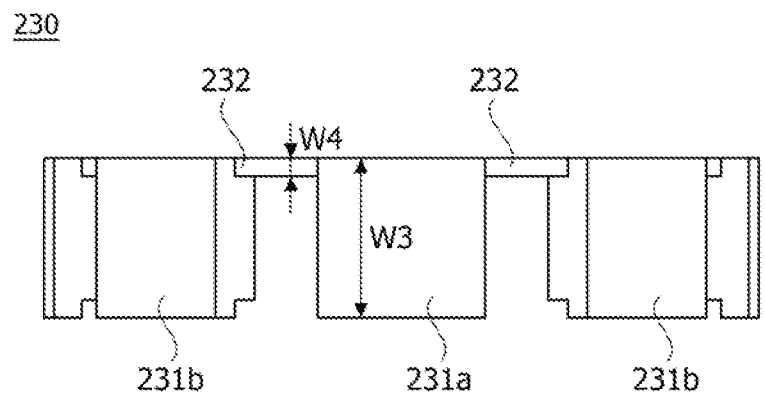

[FIG. 16]
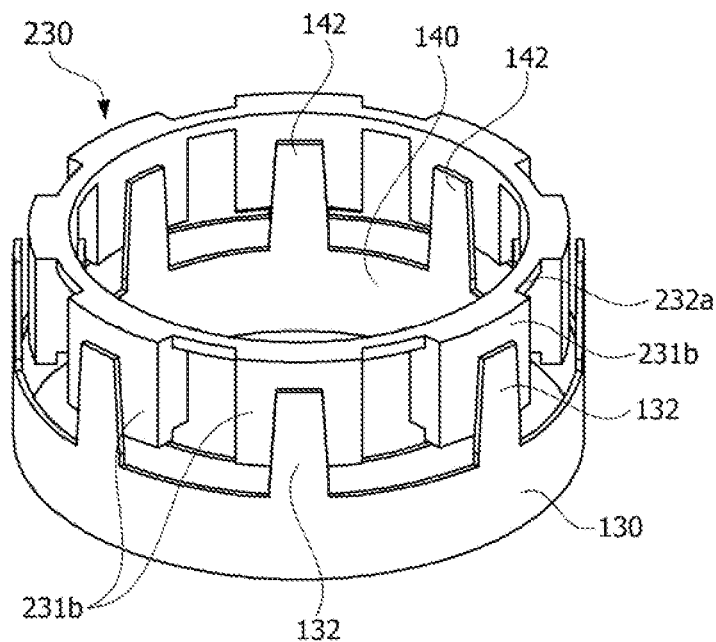
[FIG. 17]
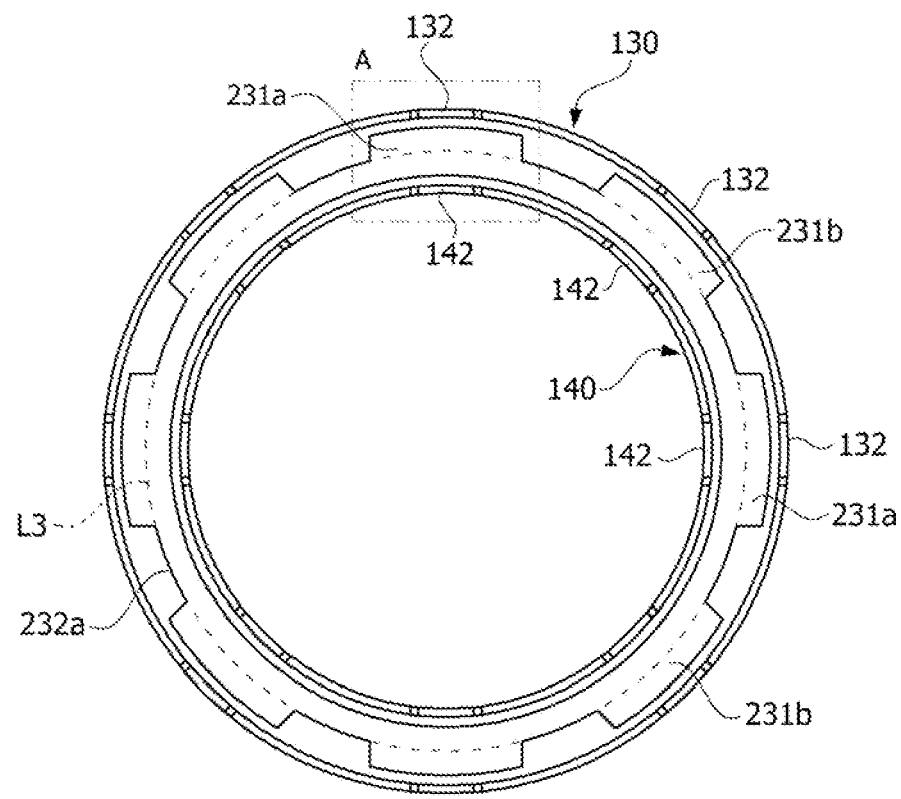

[FIG. 18]
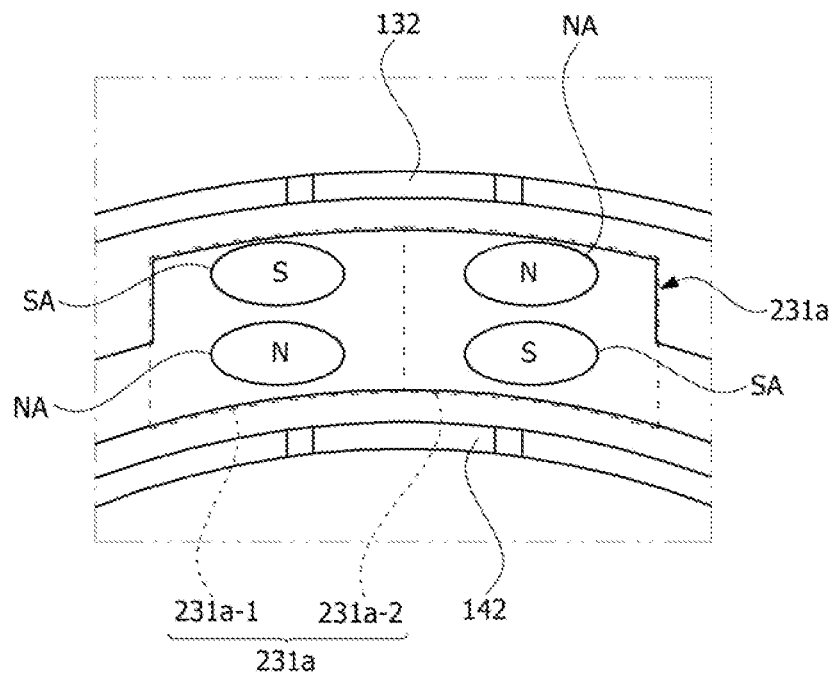
[FIG. 19]
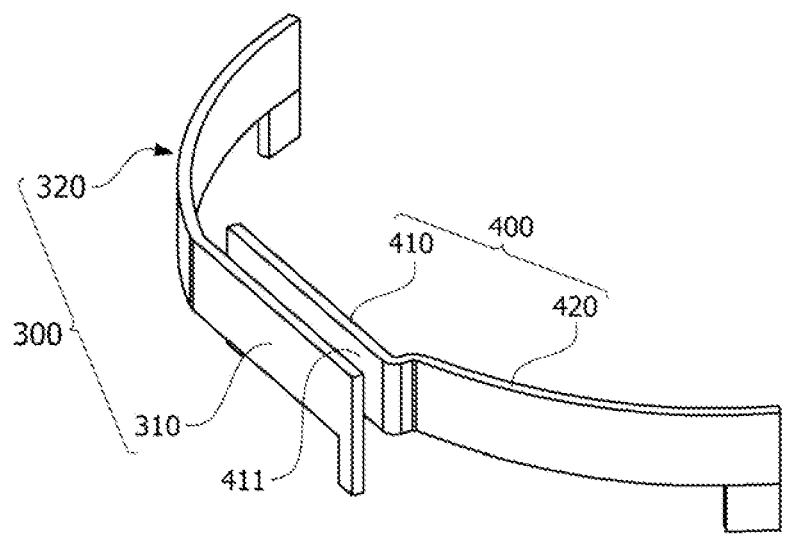

[FIG. 20]
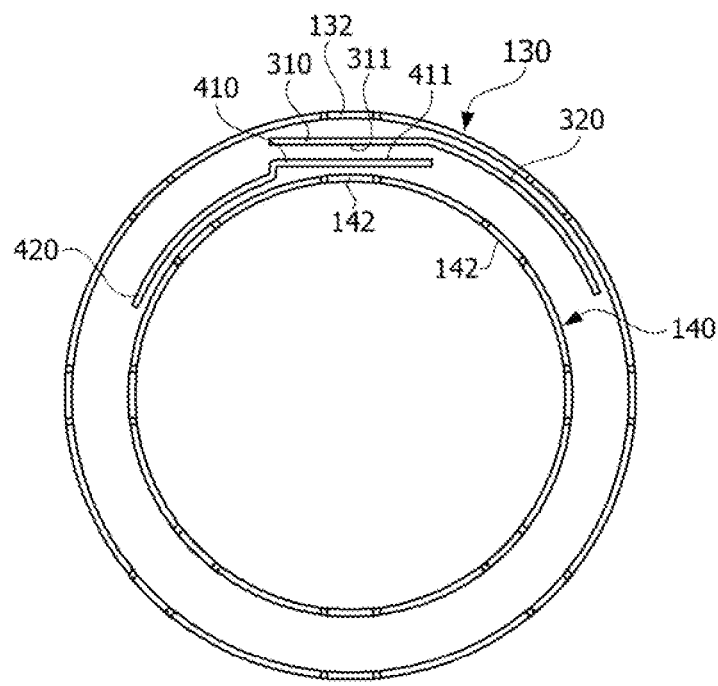
[FIG. 21]
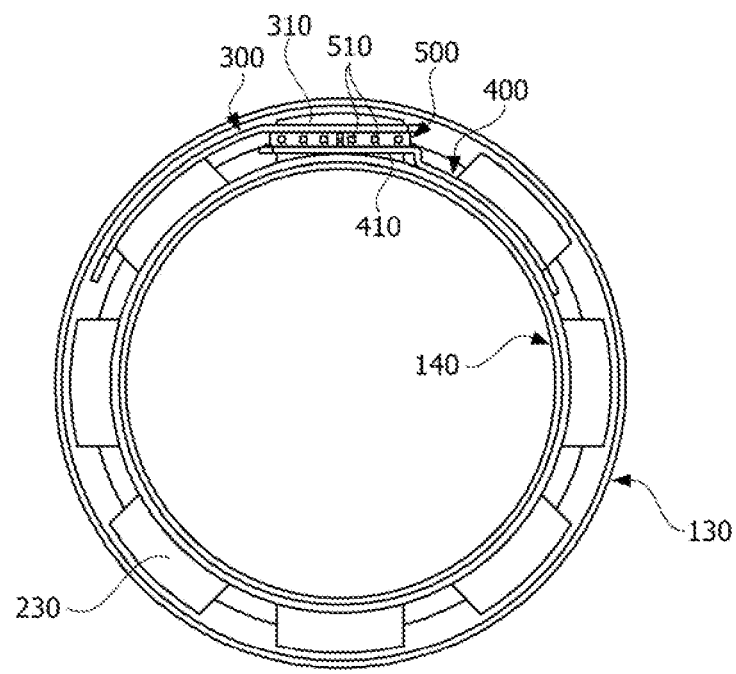

[FIG. 22]
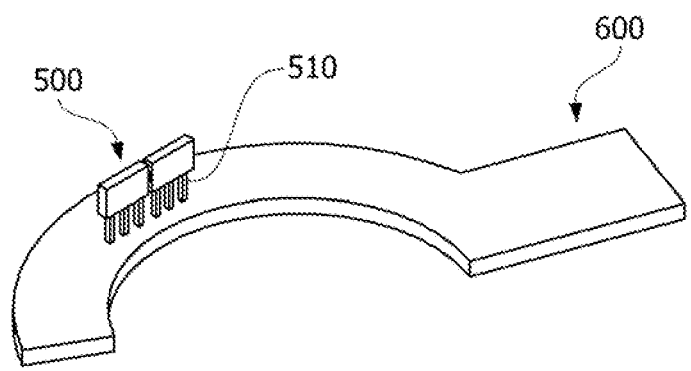
[FIG. 23]
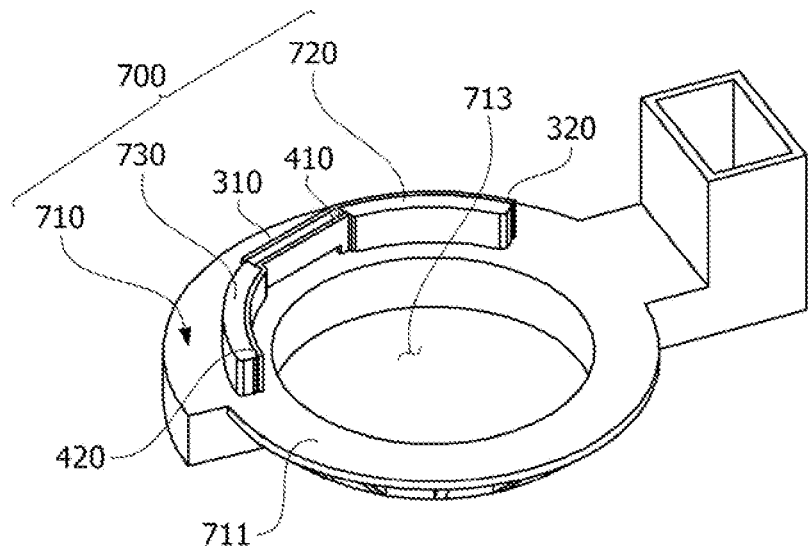

[FIG. 24]
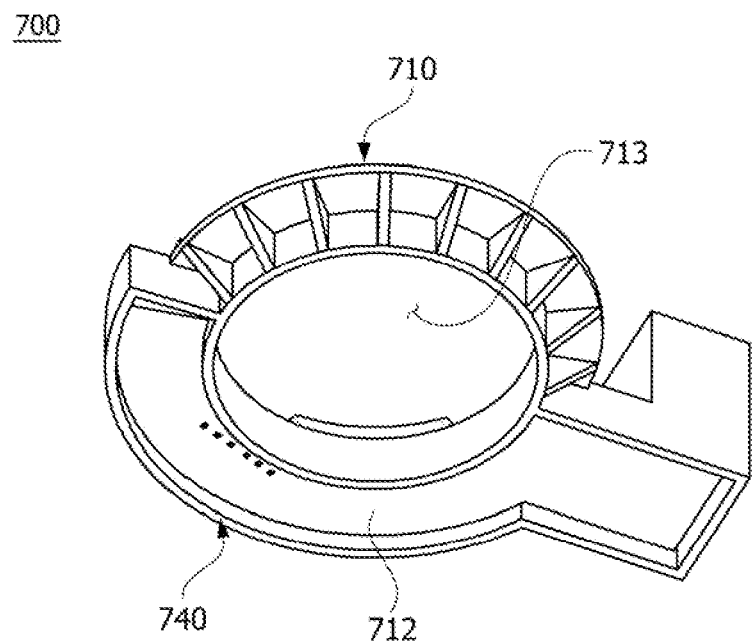

SENSING DEVICE THAT PREVENTS MAGNETIC FIELD INTERFERENCE

CROSS REFERENCE TO RELATED APPLICATIONS

This application is the National Phase of PCT International Application No. PCT/KR2018/014185, filed on Nov. 19, 2018, which claims priority under 35 U.S.C. 119(a) to Patent Application No. 10-2018-0082565, filed in the Republic of Korea on Jul. 16, 2018, all of which are hereby expressly incorporated by reference into the present application.

TECHNICAL FIELD

An embodiment relates to a sensing device.

BACKGROUND ART

An electronic power steering system (hereinafter referred to as "EPS") operates a motor in an electronic control unit according to operating conditions to ensure the turning stability and provide a high degree of resilience, thereby allowing the driver to drive safely.

In order to provide proper torque, the EPS includes a sensor assembly configured to measure torque of a steering shaft, a steering angle, and the like. The sensor assembly may include a torque sensor configured to measure torque acting on the steering shaft and an index sensor configured to measure an angular acceleration of the steering shaft. Also, the steering shaft may include an input shaft connected to a handle, an output shaft connected to a wheel-side power transmission configuration, and a torsion bar configured to connect the input shaft and the output shaft.

The torque sensor measures a degree of torsion of the torsion bar to measure the torque acting on the steering shaft. Also, the index sensor detects rotation of the output shaft to measure the angular acceleration of the steering shaft. In the sensor assembly, the torque sensor and the index sensor may be arranged together and integrally configured.

The torque sensor may include a housing, a rotor, a stator including a stator tooth, and a collector to measure the torque.

Here, the torque sensor may be provided to have a magnetic-type structure in which the collector is disposed at an outer side of the stator tooth.

However, when an external magnetic field is generated, since the collector in the structure serves as a path for the external magnetic field, there is a problem in that a magnetic flux value of a Hall integrated circuit (IC) is affected. Accordingly, a change occurs in an output value of the torque sensor, and a problem occurs in that it is not possible to accurately measure the degree of torsion of the torsion bar.

In particular, since the likelihood of the torque sensor being affected by the external magnetic field is increased due to an increase in the number of chips mounted in a vehicle, there is demand for a torque sensor that is not affected by an external magnetic field.

SUMMARY

An embodiment is directed to providing a sensing device capable of avoiding magnetic field interference due to an external magnetic field generated externally during torque measurement.

Specifically, an embodiment is directed to providing a sensing device in which a collector is disposed between stator teeth to prevent the collector from serving as a path for an external magnetic field.

Also, an embodiment is directed to providing a sensing device in which a magnet is rotatably disposed between stator teeth to charge the stator teeth.

Objectives of the embodiments are not limited to the above-mentioned objectives, and other unmentioned objectives should be clearly understood by those of ordinary skill in the art from the description below.

An embodiment provides a sensing device including a stator and a rotor of which at least a portion is disposed in the stator, wherein the stator includes a stator holder, a stator body coupled to the stator holder, and a first stator tooth and a second stator tooth disposed in the stator body, the rotor includes a rotor holder, a rotor body coupled to the rotor holder, and a magnet coupled to the rotor body, the first stator tooth includes a first body and a plurality of first teeth connected to the first body and spaced apart from each other, the second stator tooth includes a second body and a plurality of second teeth connected to the second body and spaced apart from each other, and the plurality of first teeth and the plurality of second teeth overlap in a radial direction.

Here, the magnet may include a first unit magnet, a second unit magnet, and a connecting portion disposed between the first unit magnet and the second unit magnet, the first unit magnet may include a first region and a second region, and the first region and the second region may each include an N-pole region and an S-pole region.

Also, the N-pole region of the first region and the S-pole region of the second region may be disposed to correspond to each other.

Also, the connecting portion of the magnet may not be exposed to an outer circumferential surface of the rotor body.

Also, the sensing device may further include a first collector and a second collector that are disposed to be spaced apart from each other between the first body of the first stator tooth and the second body of the second stator tooth, a sensor disposed between the first collector and the second collector, and a circuit board connected to the sensor.

Here, the first collector may include a first collector body that faces the sensor and a first extending portion that extends from the first collector body, the second collector may include a second collector body that faces the sensor and a second extending portion that extends from the second collector body, and the first extending portion and the second extending portion may not overlap each other in the radial direction.

Also, the first collector body and the second collector body may each include a flat surface, the sensor may be disposed between the first collector body and the second collector body, and the sensor may overlap the magnet in an axial direction.

Also, the sensing device may further include a housing coupled to the circuit board, the housing may include a first protrusion part and a second protrusion part that protrude in the axial direction, and the sensor may be disposed between the first protrusion part and the second protrusion part.

Also, the first protrusion part may be disposed at an inner side of the first extending portion, and the second protrusion part may be disposed at an outer side of the second extending portion.

Here, the first protrusion part may be disposed at an inner side of the first extending portion, and the second protrusion part may be disposed at an outer side of the second extending portion.

Also, the sensor may include a plurality of pins, and the plurality of pins may pass through the housing and be electrically connected to the circuit board.

Also, the sensor may be disposed on one surface of the housing, and the circuit board may be disposed on the other surface of the housing.

Also, the sensing device may further include a cover coupled to the housing, the cover may include a body portion disposed below the circuit board and a sidewall that extends from the body portion in the axial direction, and the sidewall may overlap the sensor in the radial direction.

Meanwhile, a thickness of the first unit magnet in the radial direction may be larger than a thickness of the connecting portion in the radial direction.

Here, a width of the first unit magnet in the axial direction may be larger than a width of the connecting portion in the axial direction.

Meanwhile, the stator body may include an inner side portion to which the stator holder is coupled, an outer side portion disposed at an outer side of the inner side portion in the radial direction, and a separation plate disposed between the inner side portion and the outer side portion in the radial direction, a plurality of first holes and second holes may be formed in the separation plate in a circumferential direction, the first teeth may pass through the first holes, and the second teeth may pass through the second holes.

Here, the magnet disposed between the inner side portion and the outer side portion may be disposed on an upper portion of the separation plate.

An embodiment provides a sensing device including a first stator tooth that includes first teeth and has a first radius, a second stator tooth that includes second teeth and has a second radius, a first collector and a second collector that are disposed between the first stator tooth and the second stator tooth, a sensor disposed between the first collector and the second collector, and a magnet rotatably disposed between the first stator tooth and the second stator tooth, wherein the first teeth and the second teeth are disposed to face each other and are charged to opposite polarities when the magnet rotates.

Advantageous Effects

Since a pair of collectors is disposed between a pair of stator teeth and a sensor is disposed between the collectors, a sensing device according to an embodiment can prevent or minimize magnetic field interference due to an external magnetic field generated externally during torque measurement.

Also, since first teeth of a first stator tooth and second teeth of a second stator tooth, which are disposed to be spaced apart from each other in a radial direction, are disposed to overlap each other, and a magnet is rotated between the first teeth and the second teeth, the first teeth and the second teeth may be charged to opposite polarities.

Various advantages and effects of embodiments herein are not limited to those described above and should be more easily understood from the following description of specific forms of the embodiments herein.

BRIEF DESCRIPTION OF THE DRAWINGS

FIG. 1 is a perspective view illustrating a sensing device according to an embodiment.

FIG. 2 is an exploded perspective view illustrating the sensing device according to an embodiment.

FIG. 3 is a cross-sectional perspective view illustrating the sensing device according to an embodiment.

FIG. 4 is a perspective view illustrating a stator of the sensing device according to an embodiment.

FIG. 5 is an exploded perspective view illustrating the stator of the sensing device according to an embodiment.

FIG. 6 is a cross-sectional view illustrating the stator of the sensing device according to an embodiment.

FIG. 7 is a perspective view illustrating a stator body of the stator of the sensing device according to an embodiment.

FIG. 8 is a plan view illustrating the stator body of the stator of the sensing device according to an embodiment.

FIG. 9 is a cross-sectional view illustrating the stator body of the stator of the sensing device according to an embodiment.

FIG. 10 is a lateral view illustrating a first stator tooth of the stator of the sensing device according to an embodiment.

FIG. 11 is a lateral view illustrating a second stator tooth of the stator of the sensing device according to an embodiment.

FIG. 12 is a plan view illustrating the first stator tooth and the second stator tooth of the stator of the sensing device according to an embodiment.

FIG. 13 is an exploded perspective view illustrating a rotor of the sensing device according to an embodiment.

FIG. 14 is a plan view illustrating a magnet of the rotor of the sensing device according to an embodiment.

FIG. 15 is a lateral view illustrating the magnet of the rotor of the sensing device according to an embodiment.

FIG. 16 is a perspective view illustrating arrangement of the magnet with respect to the first stator tooth and the second stator tooth of the sensing device according to an embodiment.

FIG. 17 is a plan view illustrating the arrangement of the magnet with respect to the first stator tooth and the second stator tooth of the sensing device according to an embodiment.

FIG. 18 is a view illustrating region A of FIG. 17.

FIG. 19 is a view illustrating a first collector and a second collector of the sensing device according to an embodiment.

FIG. 20 is a view illustrating the first stator tooth, the second stator tooth, the first collector, and the second collector of the sensing device according to an embodiment.

FIG. 21 is a bottom view illustrating the arrangement of the first stator tooth, the second stator tooth, the first collector, the second collector, and a sensor of the sensing device according to an embodiment.

FIG. 22 is a view illustrating a sensor disposed on a circuit board of the sensing device according to an embodiment.

FIG. 23 is a perspective view illustrating a housing of the sensing device according to an embodiment.

FIG. 24 is a bottom perspective view illustrating the housing of the sensing device according to an embodiment.

DETAILED DESCRIPTION

Hereinafter, exemplary embodiments of the present invention will be described in detail with reference to the accompanying drawings.

However, the technical idea of the present invention is not limited to some embodiments described herein and may be implemented in various different forms. One or more elements of different embodiments may be selectively combined or replaced within the scope of the technical idea of the present invention.

Also, unless otherwise defined, all terms including technical or scientific terms used in the embodiments of the present invention may be interpreted as having a meaning that may be commonly understood by those of ordinary skill in the art to which the present invention pertains, and a meaning of commonly-used terms, such as terms defined in dictionaries, may be interpreted in consideration of a meaning in the context of related technology.

Also, the terms used in the embodiments of the present invention are for describing the embodiments and are not intended to limit the present invention.

In the present specification, a singular expression may include a plural expression unless the context clearly indicates otherwise, and "at least one (or one or more) of A, B, and C" may include one or more of any of the possible combinations of A, B, and C.

Also, in describing elements of the embodiments of the present invention, terms such as first, second, A, B, (a), and (b) may be used.

Such terms are only intended to distinguish one element from another element, and the essence, order, sequence, or the like of the corresponding element is not limited by the terms.

Also, when a certain element is described as being "connected," "coupled," or "linked" to another element, this may include not only a case in which the element is directly connected, coupled, or linked to the other element but also a case in which the element is "connected," "coupled," or "linked" to the other element via another element present therebetween.

In addition, when a certain element is described as being formed or disposed above (on) or below (under)" another element, the term "above (on) or below (under)" not only includes a case in which two elements come in direct contact with each other but also includes a case in which one or more other elements are formed or disposed between the two elements. Also, the term "above (on) or below (under)" may include a downward direction as well as an upward direction with respect to one element.

Hereinafter, the embodiments will be described in detail with reference to the accompanying drawings. The same or corresponding elements will be denoted by the same reference numerals throughout the drawings and repeated descriptions thereof will be omitted.

FIG. 1 is a perspective view illustrating a sensing device according to an embodiment, FIG. 2 is an exploded perspective view illustrating the sensing device according to an embodiment, and FIG. 3 is a cross-sectional perspective view illustrating the sensing device according to an embodiment. In FIGS. 1 and 2, the x-direction indicates an axial direction, and the y-direction indicates a radial direction. Also, the axial direction and the radial direction are perpendicular to each other.

Referring to FIGS. 1 to 3, a sensing device 1 according to an embodiment may include a stator 100, a rotor 200 of which at least a portion is disposed in the stator 100, a first collector 300 disposed in the stator 100, a second collector 400 disposed in the stator 100 so as to be spaced apart from the first collector 300 in a radial direction, a sensor 500 disposed between the first collector 300 and the second collector 400, a circuit board 600 electrically connected to the sensor 500, a housing 700 to which the circuit board 600 is coupled, and a cover 800 coupled to the housing 700 so as to cover the circuit board 600. Here, the stator 100 may be connected to an output shaft (not illustrated), and the rotor 200, of which at least a portion is rotatably disposed in the stator 100, may be connected to an input shaft (not illustrated), but the present invention is not necessarily limited thereto.

Here, the rotor 200 may be disposed to be rotatable with respect to the stator 100. Also, the second collector 400 may be disposed at an inner side of the first collector 300 in the radial direction. Here, the inner side may refer to a direction toward a center C in the radial direction, and an outer side may refer to a direction opposite to the inner side.

FIG. 4 is a perspective view illustrating a stator of the sensing device according to an embodiment, FIG. 5 is an exploded perspective view illustrating the stator of the sensing device according to an embodiment, and FIG. 6 is a cross-sectional view illustrating the stator of the sensing device according to an embodiment.

The stator 100 may be connected to an output shaft (not illustrated) of a steering shaft.

Referring to FIGS. 4 to 6, the stator 100 may include a stator holder 110, a stator body 120 disposed at one side of an outer circumferential surface of the stator holder 110, and a first stator tooth 130 and a second stator tooth 140 disposed in the stator body 120. Here, the first stator tooth 130 and the second stator tooth 140 may be disposed to be spaced apart from each other in the radial direction. Also, the first stator tooth 130 and the second stator tooth 140 may be fixed to the stator body 120.

The stator holder 110 may be connected to an output shaft of an electronic power steering system (EPS). Accordingly, the stator holder 110 may rotate in association with rotation of the output shaft.

Referring to FIGS. 5 and 6, the stator holder 110 may be formed in a cylindrical shape.

Also, the stator holder 110 may be formed of a metal material. However, the present invention is not necessarily limited thereto, and of course, another material may be used for the stator holder 110 in consideration of a predetermined strength or more to allow the output shaft to be fitted and fixed.

The stator holder 110 may be coupled to the stator body 120.

Here, the stator body 120 may be disposed at one side end portion of the stator holder 110. For example, the stator body 120 may be disposed at one side end portion of the stator holder 110 by using an insert injection method using synthetic resin such as resin, but the present invention is not necessarily limited thereto.

FIG. 7 is a perspective view illustrating a stator body of the stator of the sensing device according to an embodiment, FIG. 8 is a plan view illustrating the stator body of the stator of the sensing device according to an embodiment, and FIG. 9 is a cross-sectional view illustrating the stator body of the stator of the sensing device according to an embodiment.

Referring to FIGS. 7 to 9, the stator body 120 may include a cylindrical inner side portion 121, an outer side portion 122 disposed at an outer side of the inner side portion 121 so as to be spaced apart therefrom in the radial direction, and a separation plate 123 configured to connect the inner side portion 121 and the outer side portion 122. Here, the inner side portion 121, the outer side portion 122, and the separation plate 123 may be integrally formed.

The stator holder 110 may be coupled to an inner side of the inner side portion 121.

The outer side portion 122 may be formed in a cylindrical shape. Here, the outer side portion 122 may be disposed at the outer side of the inner side portion 121 so as to be spaced apart therefrom. Accordingly, a space S may be formed between the outer side portion 122 and the inner side portion 121.

The separation plate 123 may be formed in a plate shape.

The separation plate 123 may be disposed between the inner side portion 121 and the outer side portion 122. Here, the separation plate 123 may be disposed in the radial direction to connect the inner side portion 121 and the outer side portion 122.

As illustrated in FIG. 9, the space S may be divided into a first place S1 and a second space S2 by the separation plate 123. Accordingly, a magnet 230 may be disposed on an upper portion of the separation plate 123, and a sensor 500 may be disposed on a lower portion of the separation plate 123.

As illustrated in FIG. 9, the separation plate 123 may be disposed below a virtual horizontal line L1 that passes through the center of the outer side portion 122 in the axial direction.

Meanwhile, a first hole 124 and a second hole 125 may be formed in the separation plate 123 for arrangement of the first stator tooth 130 and the second stator tooth 140.

Referring to FIG. 6, a first body 131 of the first stator tooth 130 and a second body 141 of the second stator tooth 140 may be disposed in the first space S1. Also, through the first hole 124 and the second hole 125 in the separation plate 123, first teeth 132 of the first stator tooth 130 and second teeth 142 of the second stator tooth 140 may be disposed in the second space S2.

The first hole 124 may be formed as a plurality of first holes 124 that are spaced apart from each other in a circumferential direction. Also, the first teeth 132 of the first stator tooth 130 are disposed in the second space S2 via the first holes 124. Here, the number of first holes 124 is the same as the number of first teeth 132 of the first stator tooth 130.

The first holes 124 may be disposed to be adjacent to an inner circumferential surface of the outer side portion 122. As illustrated in FIG. 8, the first holes 124 may be formed in the separation plate 123 so as to come in contact with the inner circumferential surface of the outer side portion 122.

The second hole 125 may be formed as a plurality of second holes 125 that are spaced apart from each other in the circumferential direction. Here, the second holes 125 may be disposed at inner sides of the first holes 124 so as to be spaced apart therefrom in the radial direction. Also, the second teeth 142 of the second stator tooth 140 are disposed in the second space S2 via the second holes 125. Here, the number of second holes 125 is the same as the number of second teeth 142 of the second stator tooth 140.

The second holes 125 may be disposed to be adjacent to an outer circumferential surface of the inner side portion 121. As illustrated in FIG. 8, the second holes 125 may be formed in the separation plate 123 so as to come in contact with the outer circumferential surface of the inner side portion 121.

The first stator tooth 130 and the second stator tooth 140 may be coupled to the stator body 120. Here, the first stator tooth 130 and the second stator tooth 140 may be disposed between the outer circumferential surface of the inner side portion 121 and the inner circumferential surface of the outer side portion 122 of the stator body 120. Here, the first stator tooth 130 and the second stator tooth 140 may be formed of a metal material so that the first stator tooth 130 and the second stator tooth 140 may be charged due to rotation of the magnet 230.

Also, the first stator tooth 130 may be fixed to the inner circumferential surface of the outer side portion 122 by an adhesive member (not illustrated) such as a glue, and the second stator tooth 140 may be fixed to the outer circumferential surface of the inner side portion 121 by an adhesive member (not illustrated) such as a glue, but the present invention is not necessarily limited thereto. For example, each of the first stator tooth 130 and the second stator tooth 140 may be fixed to the stator body 120 by using a fastening member (not illustrated), a caulking method, or the like.

FIG. 10 is a lateral view illustrating a first stator tooth of the stator of the sensing device according to an embodiment, and FIG. 11 is a lateral view illustrating a second stator tooth of the stator of the sensing device according to an embodiment.

Referring to FIGS. 5 and 10, the first stator tooth 130 may include a ring-shaped first body 131 and the plurality of first teeth 132 that protrude from the first body 131 in the axial direction and are spaced apart from each other. For example, the first teeth 132 may be disposed to be spaced apart from each other in the circumferential direction and may extend upward from an upper portion of the first body 131. Accordingly, the first body 131 and the plurality of first teeth 132 may be integrally formed. Here, the first body 131 may be referred to as a "first tooth body."

The first teeth 132 may each have a shape in which a width is wide at the bottom and decreases in an upward direction. For example, when viewed in the radial direction, a width of a lower portion of the first tooth 132 may be larger than a width of an upper portion of the first tooth 132. As illustrated in FIG. 10, the first tooth 132 may be formed in a trapezoidal shape.

Also, since the first teeth 132 pass through the first holes 124, an upper surface of the first body 131 may come in contact with a lower surface of the separation plate 123.

Referring to FIGS. 5 and 11, the second stator tooth 140 may include a ring-shaped second body 141 and the plurality of second teeth 142 that protrude from the second body 141 in the axial direction and are spaced apart from each other. For example, the second teeth 142 may be disposed to be spaced apart from each other in the circumferential direction and may extend upward from an upper portion of the second body 141. Accordingly, the second body 141 and the plurality of second teeth 142 may be integrally formed. Here, the second body 141 may be referred to as a "second tooth body."

The second teeth 142 may each have a shape in which a width is wide at the bottom and decreases in an upward direction. For example, when viewed in the radial direction, a width of a lower portion of the second tooth 142 may be larger than a width of an upper portion of the second tooth 142. As illustrated in FIG. 11, the second tooth 142 may be formed in a trapezoidal shape.

Also, since the second teeth 142 pass through the second holes 125, an upper surface of the second body 141 may come in contact with the lower surface of the separation plate 123.

Referring to FIG. 10, with respect to an upper surface 131a of the first body 131, a height H1 of the first body 131 is smaller than a height H2 of the first teeth 132. Also, referring to FIG. 11, with respect to an upper surface 141a of the second body 141, a height H3 of the second body 141 is smaller than a height H4 of the second teeth 142. Also, the height H1 of the first body 131 may be the same as the height H3 of the second body 141, and the height H2 of the first teeth 132 may be the same as the height H4 of the second teeth 142.

FIG. 12 is a plan view illustrating the first stator tooth and the second stator tooth of the stator of the sensing device according to an embodiment.

Referring to FIG. 12, the first stator tooth 130 is disposed at an outer side of the second stator tooth 140. Here, with respect to the center C, the first stator tooth 130 may be formed to have a first radius R1, and the second stator tooth 140 may be formed to have a second radius R2. Specifically, with respect to the center C, a radius of the first body 131 is larger than a radius of the second body 141.

Also, with respect to the center C, a center C1 of the first tooth 132 and a center C2 of the second tooth 142 may be disposed on a virtual radial line L2. Accordingly, when viewed in the radial direction (y-direction), the first tooth 132 and the second tooth 142 may be disposed to overlap each other in the radial direction. Accordingly, the first tooth 132 and the second tooth 142 may reduce leakage.

As illustrated in FIG. 12, with respect to the center C, one side corner and the other side corner of the first tooth 132 may form a first angle θ1. Also, with respect to the center C, one side corner and the other side corner of the second tooth 142 may form a second angle θ2.

Also, in the circumferential direction, a first width W1 between the one side corner and the other side corner of the first tooth 132 may be the same as a second width W2 between the one side corner and the other side corner of the second tooth 142. In addition, the first tooth 132 may be disposed within the second angle θ2. Accordingly, the first tooth 132 and the second tooth 142 may be disposed to overlap each other in the radial direction.

Here, the case in which the first width W1 of the first tooth 132 and the second width W2 of the second tooth 142 are the same has been described above as an example, but the present invention is not necessarily limited thereto. For example, the first width W1 of the first tooth 132 may also be larger than the second width W2 of the second tooth 142.

The rotor 200 may be disposed to be rotatable with respect to the stator 100. Also, the rotor 200 may be connected to an input shaft (not illustrated) of the steering shaft.

FIG. 13 is an exploded perspective view illustrating a rotor of the sensing device according to an embodiment.

Referring to FIGS. 2 and 13, the rotor 200 may include a rotor holder 210, a rotor body 220 disposed at one side of an outer circumferential surface of the rotor holder 210, and the magnet 230 coupled to the rotor body 220. Here, the rotor holder 210 and the magnet 230 may be coupled to the rotor body 220 due to the rotor body 220 being formed using the insert injection method using synthetic resin such as resin. Also, the magnet 230 of the rotor 200 may be disposed between the first tooth 132 and the second tooth 142.

The rotor holder 210 may be connected to an input shaft of the EPS. Accordingly, the rotor holder 210 may rotate in association with rotation of the input shaft.

As illustrated in FIG. 13, the rotor holder 210 may be formed in a cylindrical shape. Also, an end portion of the rotor holder 210 may be coupled to the rotor body 220.

The rotor holder 210 may be formed of a metal material. However, the present invention is not necessarily limited thereto, and of course, another material may be used for the rotor holder 210 in consideration of a predetermined strength or more to allow the output shaft to be fitted and fixed.

Referring to FIG. 13, the rotor body 220 may include a coupling portion 221 coupled to the rotor holder 210, a plurality of protrusions 222 that extend downward from the coupling portion 221, and a frame 223 configured to connect lower sides of the protrusions 222.

The plurality of protrusions 222 may be disposed to be spaced apart from each other in the circumferential direction. Accordingly, holes 224 may be formed between the protrusions 222 in the radial direction.

The frame 223 may be disposed to connect lower portions of the protrusions 222. Here, the frame 223 may be disposed at an inner side with respect to the protrusions 222.

Accordingly, the frame 223 supports a lower portion of the magnet 230 disposed in the hole 224 and prevents the magnet 230 from falling out in the axial direction.

The magnet 230 may be coupled to the rotor body 220 and rotate in association with rotation of the rotor holder 210. Here, the magnet 230 may be rotatably disposed between the first stator tooth 130 and the second stator tooth 140.

Referring to FIG. 13, the magnet 230 may include a plurality of unit magnets 231 disposed to be spaced apart from each other in the circumferential direction. Also, the magnet 230 may include a connecting portion 232 disposed between the unit magnets 231 to connect the unit magnets 231. Here, the unit magnets 231 and the connecting portion 232 may be integrally formed. Here, eight unit magnets 231 may be provided.

Here, as the unit magnets 231, first unit magnets 231a and second unit magnets 231b may be alternately disposed in the circumferential direction. Also, the first unit magnets 231a and the second unit magnets 231b may be connected by the connecting portion 232. Therefore, the magnet 230 may include the first unit magnets 231a, the second unit magnets 231b, and the connecting portion 232.

FIG. 14 is a plan view illustrating a magnet of the rotor of the sensing device according to an embodiment, and FIG. 15 is a lateral view illustrating the magnet of the rotor of the sensing device according to an embodiment.

Referring to FIG. 14, a thickness T1 of the first unit magnet 231a in the radial direction is larger than a thickness T2 of the connecting portion 232 in the radial direction.

Referring to FIG. 15, a width W3 of the first unit magnet 231a in the axial direction is larger than a width W4 of the connecting portion 232 in the axial direction.

FIG. 16 is a perspective view illustrating arrangement of the magnet with respect to the first stator tooth and the second stator tooth of the sensing device according to an embodiment, and FIG. 17 is a plan view illustrating the arrangement of the magnet with respect to the first stator tooth and the second stator tooth of the sensing device according to an embodiment. Also, FIG. 18 is a view illustrating region A of FIG. 17.

Referring to FIGS. 16 and 17, the first unit magnets 231a and the second unit magnets 231b of the magnet 230 may be disposed between the first teeth 132 and the second teeth 142. Also, the magnet 230 may rotate in the circumferential direction between the first teeth 132 and the second teeth 142.

Referring to FIG. 18, the first unit magnet 231a may include a first region 231a-1 and a second region 231a-2. Also, the first region 231a-1 and the second region 231a-2 may each include an N-pole region NA and an S-pole region SA. Here, the N-pole region NA of the first region 231a-1 and the S-pole region SA of the second region 231a-2 may be disposed adjacent to each other.

In FIG. 16, the first region 231a-1 and the second region 231a-2 are illustrated as being vertically divided from each other in the circumferential direction, but the present invention is not necessarily limited thereto. For example, considering that the first region 231a-1 and the second region 231a-2 each include the N-pole region NA and the S-pole region SA, the first region 231a-1 and the second region 231a-2 may also be divided into an outer side region and an inner side region in the radial direction.

Therefore, as illustrated in FIG. 18, the N-pole region NA and the S-pole region SA may be disposed in the first unit magnet 231a in a diagonal direction. Here, the case in which the first unit magnet 231a includes the first region 231a-1 and the second region 231a-2 has been described above as an example, but the second unit magnet 231b may also include the first region 231a-1 and the second region 231a-2.

Referring to FIG. 18, when the magnet 230 rotates clockwise, the first tooth 132 of the first stator tooth 130 approaches the S-pole and thus is charged to the S-pole. Also, the second tooth 142 of the second stator tooth 140 approaches the N-pole and thus is charged to the N-pole. Accordingly, the sensor 500 may measure an angle through a magnetic field applied through the first collector 300 and the second collector 400. Here, when a width of the first unit magnet 231a in the circumferential direction is increased, the sensor 500 may measure an angle in a wider range.

When the magnet 230 rotates counterclockwise, the first tooth 132 of the first stator tooth 130 approaches the N-pole and thus is charged to the N-pole. Also, the second tooth 142 of the second stator tooth 140 approaches the S-pole and thus is charged to the S-pole.

That is, in a state in which the first tooth 132 and the second tooth 142 are disposed to face each other, the first tooth 132 and the second tooth 142 may be charged to the opposite polarities when the magnet 230 rotates.

The connecting portion 232 connects the unit magnets 231. For example, the connecting portion 232 may be disposed between the first unit magnet 231a and the second unit magnet 231b.

The connecting portion 232 may connect upper portions of the first unit magnet 231a and the second unit magnet 231b. Here, the connecting portion 232 may be disposed at an inner side with respect to a circumferential line L3 that passes through the center of each of the first unit magnet 231a and the second unit magnet 231b in the radial direction. Here, the line L3 may be a virtual line.

Therefore, when the magnet 230 is disposed in the rotor body 220, as illustrated in FIG. 2, the connecting portion 232 of the magnet 230 is not exposed to the outer circumferential surface of the rotor body 220. For example, the rotor body 220 is disposed to cover an outer side surface 232a of the connecting portion 232.

The first collector 300 and the second collector 400 collect flux of the stator 100. Here, the first collector 300 and the second collector 400 may be formed of a metal material and may be disposed to be spaced apart from each other in the radial direction.

Referring to FIG. 2, the first collector 300 and the second collector 400 may be disposed on an upper portion of the housing 700.

FIG. 19 is a view illustrating a first collector and a second collector of the sensing device according to an embodiment, and FIG. 20 is a view illustrating the first stator tooth, the second stator tooth, the first collector, and the second collector of the sensing device according to an embodiment.

Referring to FIGS. 3 and 20, the first collector 300 and the second collector 400 may be disposed to be spaced apart from each other between the first body 131 of the first stator tooth 130 and the second body 141 of the second stator tooth 140. Therefore, the first stator tooth 130 and the second stator tooth 140 may block an external magnetic field and prevent or minimize an influence of the external magnetic field on the first collector 300 and the second collector 400.

Referring to FIG. 19, the first collector 300 may include a first collector body 310 and a first extending portion 320.

The first collector body 310 may be disposed to face the sensor 500. Here, the first collector body 310 may include a flat surface 311 disposed to face the sensor 500. Here, the flat surface 311 of the first collector body 310 may be disposed at an outer side of the sensor 500 with respect to the sensor 500.

The first extending portion 320 may extend from one side of the first collector body 310 in the circumferential direction. As illustrated in FIG. 19, the first extending portion 320 may include a curved surface formed with a predetermined curvature.

Referring to FIG. 19, the second collector 400 may include a second collector body 410 and a second extending portion 420.

The second collector body 410 may be disposed to face the sensor 500. Here, the second collector body 410 may include a flat surface 411 disposed to face the sensor 500. Here, the flat surface 411 of the second collector body 410 may be disposed at an inner side of the sensor 500 with respect to the sensor 500.

The second extending portion 420 may extend from one side of the second collector body 410 in the circumferential direction. As illustrated in FIG. 19, the second extending portion 420 may include a curved surface formed with a predetermined curvature.

Here, in the circumferential direction, the second extending portion 420 may extend in a direction opposite to a direction in which the first extending portion 320 extends. As illustrated in FIG. 20, the first extending portion 320 may extend in a clockwise direction, the second extending portion 420 may extend in a counterclockwise direction, and the first extending portion 320 and the second extending portion 420 may be disposed so as not to overlap each other in the radial direction.

That is, only the first collector body 310 and the second collector body 410 are disposed to overlap each other in the radial direction.

Referring to FIG. 20, since the first extending portion 320 and the second extending portion are disposed between the first body 131 and the second body 141 so as not to overlap each other in the radial direction, leakage may be minimized.

The sensor 500 may detect a change in a magnetic field that occurs between the stator 100 and the rotor 200. A Hall integrated circuit (IC) may be provided as the sensor 500. Accordingly, the sensor 500 detects magnetization of the stator 100 that occurs due to an electrical interaction between the magnet 230 of the rotor 200 and the stator 100. Also, the sensing device 1 may measure torque on the basis of the detected magnetization.

FIG. 21 is a bottom view illustrating the arrangement of the first stator tooth, the second stator tooth, the first collector, the second collector, and the sensor of the sensing device according to an embodiment.

Referring to FIG. 21, the sensor 500 may be disposed between the first collector body 310 of the first collector 300 and the second collector body 410 of the second collector 400. Also, the sensor 500 may be disposed to overlap the magnet 230 in the axial direction. That is, when viewed from the bottom in the axial direction, the sensor 500 may overlap the magnet 230 in the axial direction. However, the separation plate 123 may be disposed between the sensor 500 and the magnet 230.

FIG. 22 is a view illustrating the sensor disposed on a circuit board of the sensing device according to an embodiment.

Referring to FIGS. 3 and 22, the sensor 500 may include a plurality of pins 510.

The pins 510 may pass through the housing 700 and be electrically connected to the circuit board 600.

The circuit board 600 may be connected to an electronic control unit (ECU) of a motor, which assists steering force, to allow torque to be calculated on the basis of the measured change in the magnetic field.

Referring to FIG. 3, the circuit board 600 may be coupled to a lower portion of the housing 700.

FIG. 23 is a perspective view illustrating a housing of the sensing device according to an embodiment, and FIG. 24 is a bottom perspective view illustrating the housing of the sensing device according to an embodiment.

The housing 700 may be formed of a synthetic resin material such as plastic.

Referring to FIGS. 23 and 24, the housing 700 may include a housing body 710, a first protrusion part 720 and a second protrusion part 730 that protrude from an upper surface 711 of the housing body 710 in the axial direction, and a third protrusion part 740 that protrudes from a lower surface 712 of the housing body 710 in the axial direction. Here, the housing body 710, the first protrusion part 720, the second protrusion part 730, and the third protrusion part 740 may be integrally formed.

The housing body 710 may be formed in a plate shape, and a hole 713 may be formed in the center of the housing body 710. Also, the stator body 120 of the stator 100 may be disposed in the hole 713. Specifically, the inner side portion 121 of the stator body 120 may be disposed in the hole 713.

The first protrusion part 720 and the second protrusion part 730 may be disposed on the upper surface 711 of the housing body 710 so as to be spaced apart from each other in the circumferential direction.

Here, the first protrusion part 720 may be disposed at an inner side of the first extending portion 320, and the second protrusion part 730 may be disposed at an outer side of the second extending portion 420.

Also, the sensor 500 may be disposed between the first protrusion part 720 and the second protrusion part 730. Accordingly, the sensor 500 may be disposed between the first collector body 310 of the first collector 300 and the second collector body 410 of the second collector 400.

Here, the sensor 500 may be disposed on an upper portion of the housing body 710. Specifically, the sensor 500 may be disposed on the upper surface 711, which is one surface of the housing body 710.

The circuit board 600 may be disposed on a lower portion of the housing body 710. Specifically, the sensor 500 may be disposed on the lower surface 712, which is the other surface of the housing body 710, but the present invention is not necessarily limited thereto. For example, as illustrated in FIG. 3, the circuit board 600 may also be disposed to be spaced apart from the lower surface 712 of the housing body 710 in the axial direction.

The third protrusion part 740 may be formed to protrude from the lower surface 712 of the housing body 710 in the axial direction, and a cavity may be formed in the third protrusion part 740 so that the circuit board 600 is disposed therein. Here, for arrangement of the circuit board 600, an opening may be formed in a lower portion of the third protrusion part 740.

The cover 800 is coupled to the lower portion of the housing 700.

Referring to FIGS. 1 to 3, the cover 800 may include a body portion 810 disposed below the circuit board 600 and a sidewall 820 that extends from the body portion 810 in the vertical direction (axial direction).

The body portion 810 may be disposed to cover the opening. Accordingly, the body portion 810 may protect the circuit board 600 disposed inside the third protrusion part 740.

The sidewall 820 may protrude to extend upward from one side edge of the body portion 810. Here, the sidewall 820 may be disposed at an outer side of the stator 100 so as to be spaced apart therefrom.

Referring to FIG. 3, the sidewall 820 may be disposed to overlap the sensor 500 in the radial direction.

Accordingly, the sidewall 820 may block an external magnetic field and prevent or minimize an influence of the external magnetic field on the first collector 300, the second collector 400, and the sensor 500.

The present invention has been described above on the basis of embodiments thereof, but those of ordinary skill in the art should understand that various modifications and changes may be made to the present invention within the scope not departing from the idea and area of the present invention stated in the claims below. Also, differences relating to the modifications and changes should be interpreted as falling within the scope of the present invention defined by the attached claims.

DESCRIPTION OF REFERENCE NUMERALS

1: sensing device, 100: stator, 110: stator holder, 120: stator body, 130: first stator tooth, 140: second stator tooth, 200: rotor, 210: rotor holder, 220: rotor body, 230: magnet, 300: first collector, 400: second collector, 500: sensor, 600: circuit board, 700: housing, 800: cover

The invention claimed is:
1. A sensing device comprising:
a stator; and
a rotor of which at least a portion is disposed in the stator,
wherein the stator includes a stator holder, a stator body coupled to the stator holder, and a first stator tooth and a second stator tooth disposed in the stator body,
the rotor includes a rotor holder, a rotor body coupled to the rotor holder, and a magnet coupled to the rotor body,
the first stator tooth includes a first body and a plurality of first teeth connected to the first body and spaced apart from each other,
the second stator tooth includes a second body and a plurality of second teeth connected to the second body and spaced apart from each other, and
the plurality of first teeth and the plurality of second teeth overlap in a radial direction,
wherein the sensing device further comprises:
a first collector and a second collector disposed to be spaced apart from each other between the first body of the first stator tooth and the second body of the second stator tooth;
a sensor disposed between the first collector and the second collector; and
a circuit board connected to the sensor, and
wherein:
the first collector includes a first collector body that faces the sensor and a first extending portion that extends from the first collector body in a first radial direction, the second collector includes a second collector body that faces the sensor and a second extending portion that extends from the second collector body in a second radial direction opposite to the first radial direction such that the first extending portion and the second extending portion do not overlap each other, the first collector body and the second collector body each include a flat surface, and the sensor is disposed between the flat surfaces of the first collector body and the second collector body.

2. The sensing device of claim 1, wherein:
the magnet includes a first unit magnet, a second unit magnet, and a connecting portion disposed between the first unit magnet and the second unit magnet;
the first unit magnet includes a first region and a second region; and
the first region and the second region each include an N-pole region and an S-pole region.

3. The sensing device of claim 2, wherein the N-pole region of the first region and the S-pole region of the second region are disposed to correspond to each other.

4. The sensing device of claim 3, wherein the connecting portion of the magnet is not exposed to an outer circumferential surface of the rotor body.

5. The sensing device of claim 2, wherein a thickness of the first unit magnet in a radial direction is larger than a thickness of the connecting portion in the radial direction.

6. The sensing device of claim 5, wherein a width of the first unit magnet in an axial direction is larger than a width of the connecting portion in the axial direction.

7. The sensing device of claim 1, wherein:
the sensor overlaps the magnet in an axial direction.

8. The sensing device of claim 1, further comprising a housing coupled to the circuit board,
wherein the housing includes a first protrusion part and a second protrusion part that protrude in an axial direction, and
the sensor is disposed between the first protrusion part and the second protrusion part.

9. The sensing device of claim 8, wherein:
the first protrusion part is disposed at an inner side of the first extending portion; and
the second protrusion part is disposed at an outer side of the second extending portion.

10. The sensing device of claim 8, wherein:
the sensor includes a plurality of pins; and
the plurality of pins pass through the housing and are electrically connected to the circuit board.

11. The sensing device of claim 8, wherein:
the sensor is disposed on one surface of the housing; and
the circuit board is disposed on the other surface of the housing.

12. The sensing device of claim 8, further comprising a cover coupled to the housing,
wherein the cover includes a body portion disposed below the circuit board and a sidewall that extends from the body portion in the axial direction, and
the sidewall overlaps the sensor in a radial direction.

13. The sensing device of claim 1, wherein:
the stator body includes an inner side portion to which the stator holder is coupled, an outer side portion disposed at an outer side of the inner side portion in the radial direction, and a separation plate disposed between the inner side portion and the outer side portion in the radial direction;
a plurality of first holes and second holes are formed in the separation plate in a circumferential direction; and
the first teeth pass through the first holes, and the second teeth pass through the second holes.

14. The sensing device of claim 13, wherein the magnet disposed between the inner side portion and the outer side portion is disposed on an upper portion of the separation plate.

15. A sensing device comprising:
a first stator tooth that includes first teeth and has a first radius;
a second stator tooth that includes second teeth and has a second radius;
a first collector and a second collector that are disposed between the first stator tooth and the second stator tooth;
a sensor disposed between the first collector and the second collector; and
a magnet rotatably disposed between the first stator tooth and the second stator tooth,
wherein the first teeth and the second teeth are disposed to face each other and are charged to opposite polarities when the magnet rotates, and
wherein:
the magnet includes a first unit magnet, a second unit magnet, and a connecting portion disposed between the first unit magnet and the second unit magnet,
the first unit magnet includes a first region comprises an N-pole region closer to the second stator tooth and an S-pole region closer to the first stator tooth,
the first unit magnet includes a second region comprises an S-pole region closer to the second stator tooth and an N-pole region closer to the first stator tooth, and
wherein the first region and the second region are disposed adjacent to each other such that when the magnet rotates clockwise, the first stator tooth approaches the S-pole region and thus is charged to the S-pole, and the second stator tooth approaches the N-pole region and thus is charged to the N-pole.

16. The sensing device of claim 15, wherein a thickness of the first unit magnet in a radial direction is larger than a thickness of the connecting portion in the radial direction.

17. The sensing device of claim 15, further comprising:
a circuit board connected to the sensor,
the sensor is disposed on one surface of the housing; and
the circuit board is disposed on the other surface of the housing.

* * * * *